(12) United States Patent
Kristensen

(10) Patent No.: US 8,225,576 B2
(45) Date of Patent: Jul. 24, 2012

(54) WIND TURBINE TOWER, CONNECTION MEANS FOR ASSEMBLING A WIND TURBINE TOWER AND METHODS THEREOF

(75) Inventor: Jonas Kristensen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 333 days.

(21) Appl. No.: 12/126,643

(22) Filed: May 23, 2008

(65) Prior Publication Data

US 2008/0308696 A1 Dec. 18, 2008

Related U.S. Application Data

(63) Continuation of application No. PCT/DK2005/000756, filed on Nov. 24, 2005.

(51) Int. Cl.
*E04B 1/00* (2006.01)
*E04C 3/00* (2006.01)

(52) U.S. Cl. .............. 52/741.14; 52/40; 52/849; 52/848

(58) Field of Classification Search .................... 52/849, 52/848, 40, 632, 745.04, 845, 844, 741.14, 52/651.07, 655.1, 854, 855, 831, 651.01
See application file for complete search history.

(56) References Cited

U.S. PATENT DOCUMENTS

| | | | |
|---|---|---|---|
| 2,705,061 A * | 3/1955 | Getz | 52/114 |
| 3,210,098 A | 10/1965 | Watts | |
| 3,843,764 A * | 10/1974 | Grawey et al. | 264/330 |
| 3,981,409 A * | 9/1976 | Flanders | 220/4.07 |
| 4,097,165 A | 6/1978 | Quayle | |
| 4,217,738 A | 8/1980 | Smith | |
| 4,810,919 A * | 3/1989 | Ponce et al. | 29/596 |
| 5,069,587 A * | 12/1991 | Levenstein | 411/432 |
| 5,083,889 A * | 1/1992 | Steinbock | 411/432 |
| 5,333,436 A * | 8/1994 | Noble | 52/849 |
| 5,687,537 A * | 11/1997 | Noble | 52/849 |
| 5,749,189 A * | 5/1998 | Oberg | 52/298 |
| 6,289,636 B1* | 9/2001 | White et al. | 52/40 |
| 6,364,609 B1* | 4/2002 | Barnes | 416/142 |
| 6,470,645 B1* | 10/2002 | Maliszewski et al. | 52/745.18 |
| 6,592,331 B1 | 7/2003 | Wobben | |

(Continued)

FOREIGN PATENT DOCUMENTS

DE 1160701 B 1/1964

(Continued)

OTHER PUBLICATIONS

International Search Report, Jul. 19, 2006, 3 pages.

(Continued)

*Primary Examiner* — Mark Wendell
(74) *Attorney, Agent, or Firm* — Wood, Herron & Evans, LLP

(57) ABSTRACT

The invention relates to a wind turbine tower comprising a tower foundation, and at least two tower sections connected by numerous sets of connecting means positioned in close proximity of each other. The connecting means comprising at least one nut with at least one assembly opening for interacting with an assembly tool.
The invention also relates to a method for assembling a wind turbine tower and a method for manufacturing a nut of connection means for fixating a wind turbine tower including at least two tower sections.

24 Claims, 5 Drawing Sheets

U.S. PATENT DOCUMENTS

| | | | |
|---|---|---|---|
| 6,709,212 B1* | 3/2004 | Lauchner | 411/342 |
| 6,915,618 B2* | 7/2005 | Payne | 52/849 |
| 7,096,639 B2* | 8/2006 | Wobben | 52/848 |
| 7,665,273 B2* | 2/2010 | Fuellhaas et al. | 52/745.04 |
| 2003/0015877 A1* | 1/2003 | Schlemenat | 290/55 |
| 2003/0071468 A1* | 4/2003 | Platt | 290/55 |
| 2003/0223841 A1 | 12/2003 | Brettschneider | |
| 2004/0006941 A1* | 1/2004 | Brinker | 52/309.4 |
| 2005/0072067 A1* | 4/2005 | Wobben | 52/155 |
| 2006/0000185 A1 | 1/2006 | Wobben | |
| 2006/0086214 A1 | 4/2006 | Smed | |
| 2007/0243063 A1* | 10/2007 | Schellstede | 416/10 |
| 2008/0041009 A1* | 2/2008 | Cairo et al. | 52/651.07 |
| 2008/0145232 A1 | 6/2008 | Ollgaard | |
| 2008/0256892 A1* | 10/2008 | Franke | 52/655.1 |
| 2009/0126284 A1* | 5/2009 | Nahlen et al. | 52/40 |
| 2009/0300996 A1* | 12/2009 | Jones | 52/40 |
| 2010/0006710 A1* | 1/2010 | Lyness et al. | 248/70 |
| 2010/0024311 A1* | 2/2010 | Wambeke et al. | 52/40 |
| 2010/0058673 A1* | 3/2010 | Numajiri | 52/40 |
| 2010/0126079 A1* | 5/2010 | Kristensen | 52/40 |
| 2010/0126115 A1* | 5/2010 | Lim et al. | 52/848 |

FOREIGN PATENT DOCUMENTS

| | | |
|---|---|---|
| DE | 29608677 U1 | 8/1996 |
| DE | 10223429 C1 | 8/2003 |
| DE | 10230273 | 2/2004 |
| DE | 102005052419 A1 | 8/2006 |
| EP | 0624434 A1 | 11/1994 |
| EP | 0898035 A2 | 2/1999 |
| EP | 1318300 | 6/2003 |
| FR | 2712845 A1 | 6/1995 |
| FR | 2857066 A1 | 1/2005 |
| GB | 2228054 A | 8/1990 |
| JP | 05192736 | 8/1993 |
| JP | 2001056009 | 2/2001 |
| JP | 2002061609 | 2/2002 |
| JP | 2004100938 A | 4/2004 |
| JP | 2008308945 A | 12/2008 |
| WO | 03100268 | 12/2003 |
| WO | 2004090263 | 10/2004 |
| WO | 2007059768 A1 | 5/2007 |

OTHER PUBLICATIONS

Jørgen Olsen: Official Action issued in Danish Patent Application No. PA 2008 01671; Jul. 7, 2009; 3 pages, Danish Patent and Trademark Office.

Jørgen Olsen: Search Report issued in Danish Patent Application No. PA 2008 01671; Jun. 29, 2009; 2 pages, Danish Patent and Trademark Office.

Official Action mailed Mar. 1, 2010 in U.S. Appl. No. 12/626,062 (16 pages).

Official Action mailed Jul. 19, 2010 in U.S. Appl. No. 12/626,062 (10 pages).

Official Action mailed Oct. 12, 2010 in U.S. Appl. No. 12/626,062 (5 pages).

Official Action mailed Mar. 16, 2011 in U.S. Appl. No. 12/626,062 (8 pages).

* cited by examiner

WIND TURBINE TOWER, CONNECTION MEANS FOR ASSEMBLING A WIND TURBINE TOWER AND METHODS THEREOF

CROSS-REFERENCE TO RELATED APPLICATIONS

The present application is a continuation of pending International patent application PCT/DK2005/000756, filed Nov. 24, 2005, which designates the United States, the content of which is incorporated herein by reference.

FIELD OF THE INVENTION

The invention relates to a wind turbine tower comprising a tower foundation, and at least two tower sections connected by connecting means positioned in close proximity of each other, connection means for assembling a wind turbine tower comprising a bolt with a threaded part, and a nut with an internal threaded part corresponding to the thread of said bolt, method for assembling a wind turbine tower comprising at least two tower sections at a wind turbine site, said method comprising the steps of establishing a foundation, positioning a first tower section on the foundation and fixating said first tower section to the foundation by sets of connection means, positioning a further tower section on the first tower section and fixating said further tower section to the first tower section by sets of connection means, and so on until the tower is established, and method of manufacturing a nut of the connection means for fixating a wind turbine tower.

BACKGROUND OF THE INVENTION

A wind turbine known in the art typically comprises a wind turbine tower positioned on a foundation and with a wind turbine nacelle positioned on top of the tower. A wind turbine rotor, comprising three wind turbine blades, is connected to the nacelle through a low speed shaft, which extends out of the nacelle front as illustrated on FIG. 1.

The wind turbine tower typically comprises a number of round tower rings mounted on top of each other, where each tower ring is made of a steel plate rolled into a circular shape and welded to constitute a closed ring.

When the different sections, that constitute the wind turbine tower, have been transported to the site at which the tower is to be erected, the sections are connected by flanged joints. The flanges are provided with an array of through going holes which allow a large number of bolts and corresponding nuts to connect a tower section with the foundation or the next section.

A way to assemble sections of a wind turbine tower by using bolts and nuts is disclosed in international patent application No. WO-A 03/100268.

However, the height of wind turbine towers has increased significantly in the recent years and has increased the strength requirements of the flange joint connections. The number of bolts and corresponding nuts used in the flange joint connections has consequently also increased significantly.

The object of the present invention is to provide a technique which allows higher strength of the flange joint connections to be established with the same or less flange material to be used.

SUMMARY OF THE INVENTION

The invention provides for a wind turbine tower wherein connecting means comprises at least one nut with at least one assembly opening for interacting with an assembly tool.

Hereby it is possible to position a nut in close proximity of the surrounding nuts of an array as well as closer to the inner surface of the tower side. Consequently, more sets of connection means in more favourable positions may be used in the flanged joint and thus establish a higher strength connection.

The length and thickness of the flanges may also be decreased as a result of the higher strength connection i.e. less flange material is used. Alternatively, flanges with the same amount of flange material may be used but with flange material of a lower strength and thus a lower cost price.

The term "assembly tool" should be understood as a tool which may be used in an assembling or disassembling operation in connection with the invention.

In an aspect of the invention, said nut with a bolt form a set of connection means. Hereby an advantageous embodiment of the invention achieved.

The term "bolt" should be understood as a headed fastener having an external thread that may meet an exacting, uniform bolt thread specification such that it can accept a nontapered nut.

In an aspect of the invention, the lower part of the nut comprises an opening with an internal thread corresponding to the thread and length of the bolt in the set. By establishing sets of nuts and bolts corresponding in size, the assembly process is enhanced even further and thus the total time of assembling the wind turbine tower is decreased.

In an aspect of the invention, said nut comprises one assembly opening for interacting with an assembly tool.

In an aspect of the invention, said one opening is positioned in the upper part of the nut and is shaped as a slot, square, penta, hex, cross, Torx or any similar shaped socket for interacting with the assembly tool.

By using the said opening shaped in one of the said ways, it is possible to use an already developed tool, instead of a special developed assembly tool, as an assembly tool needed in these couplings is already present. A further advantage is that the experiences drawn from the aforementioned coupling methods can be used in connection with this unit.

In an aspect of the invention, the size Xb of the opening with an internal thread is larger than the size Xa of the assembly opening. Hereby it is possible to manufacture an assembly opening through the nut and subsequently manufacture the opening with an internal thread in a part of the nut i.e. a more efficient way of manufacturing of the nut.

In an aspect of the invention, said nut comprises more than one assembly opening e.g. two or three assembly openings for interacting with one assembly tool. Hereby it is possible to use small openings but—all together—with a large surface in the openings to meet the assembly tool.

In an aspect of the invention, said more than one opening are positioned in the upper part of the nut and are circular shaped sockets such as "snake eyes" for interacting with the assembly tool. The circular shaped sockets are particularly easy assembly openings to manufacture.

In an aspect of the invention, said tower sections are connected in a flanged joint with one or more arrays of sets of connection means.

In aspects of the invention, the nuts of said sets of connection means are tightened by said assembly tool. Further, bolts of said sets of connection means comprise means for interacting with a holding tool.

Hereby it is possible to hold the bolt with a holding tool wherein a holding procedure does not require any significant work space. Consequently, the bolt may also have an internal assembly opening or a standard head such as hex head adapted to be held by a standard wrench while the nut is being tightened by the assembly tool.

The assembly procedure of a set of connection means such as a bolt and a corresponding nut requires at least one means being tightened e.g. one being tightened and one being held in place. A normal procedure may involve the nut being tightened and the bolt being held in place as the opposite procedure may result in an overturning of the bolt head.

In an aspect of the invention, the length Lb of the shaft of said bolt is prechosen to correspond substantially to the sum of the size Tf of said flanged joint and the length Ln2 of the internal thread part of said nut. Hereby it is possible to design the set of connection in the jointed flange with a minimal distance between the bolt tip and the assembly tool i.e. allowing a preferred force transfer during the assembly.

The invention also relates to connection means wherein the nut further comprises at least one assembly opening for interacting with an assembly tool.

Further, the invention relates to a method for assembling a wind turbine tower where a fixating is initiated by an assembly tool tightening a set of connection means by entering at least one assembly opening in a nut of said set of connection means. Hereby it is possible to decrease the assembly time as the positioning and use of the assembly tool in relation to the nut is less demanding and requires less precision.

Even further, the invention relates to a method for manufacturing a nut of the connection means for fixating wind turbine tower including at least two tower sections, said method comprising the steps of, establishing a through going hole in said nut, establishing an assembly opening in the nut, and establishing an internal thread in the lower part of the hole whereby the size of the internal thread is larger than the size of the assembly opening.

BRIEF DESCRIPTION OF THE DRAWINGS

The invention will be described in the following with reference to the figures in which FIG. 1. illustrates a large modern wind turbine.

DETAILED DESCRIPTION OF THE INVENTION

Figure 1:
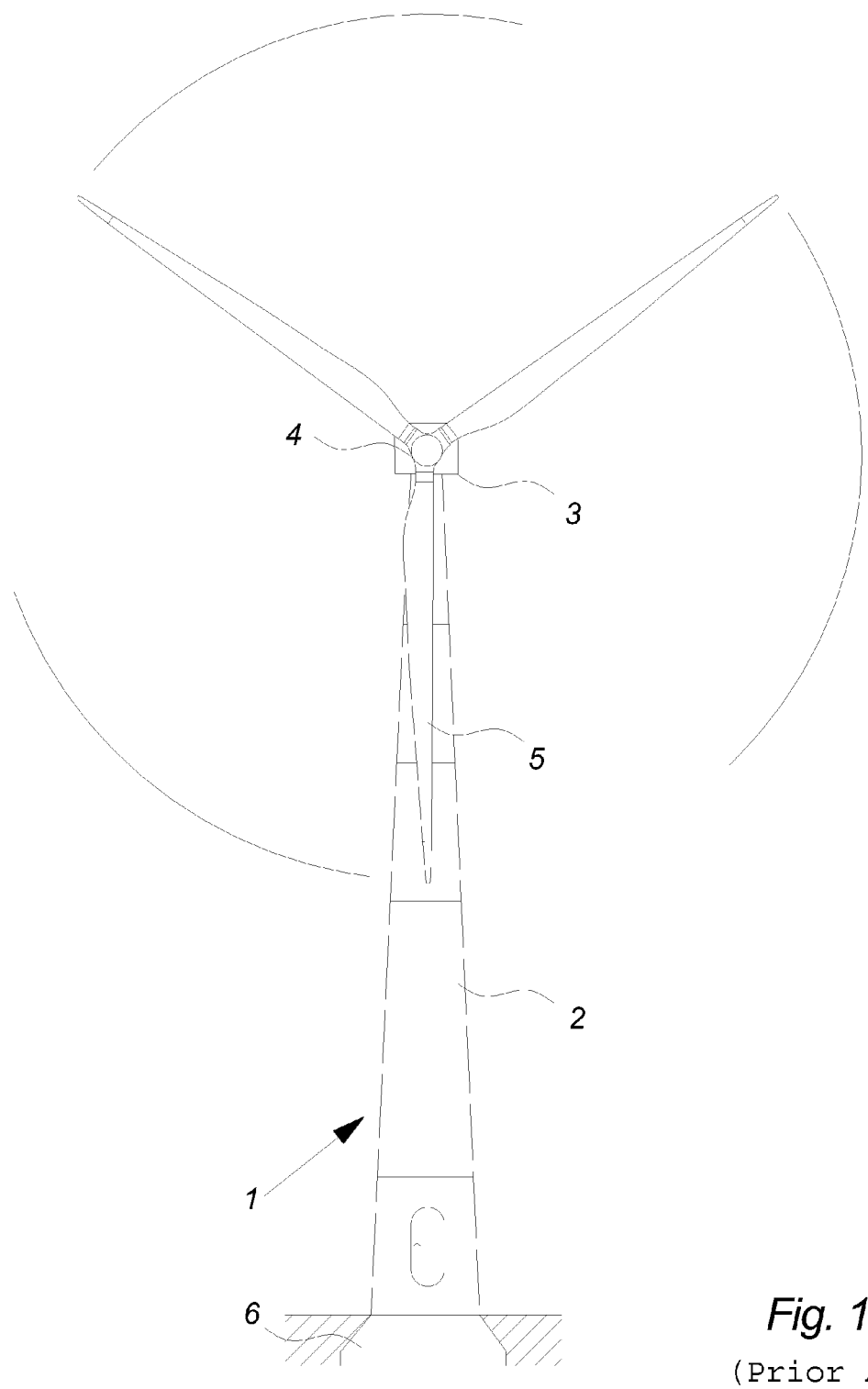

FIG. 1 illustrates a modern wind turbine 1 mounted on a foundation 6. The wind turbine comprises a tower 2, including a number of tower sections such as tower rings, and a wind turbine nacelle 3 positioned on top of the tower 2. The wind turbine rotor 4, comprising three wind turbine blades 5, is connected to the nacelle through the low speed shaft which extends out of the nacelle front.

The different components of a wind turbine are usually transported separately to the site of mounting and assembled there e.g. the different tower sections, the nacelle and the wind turbine blades.

Figure 2:
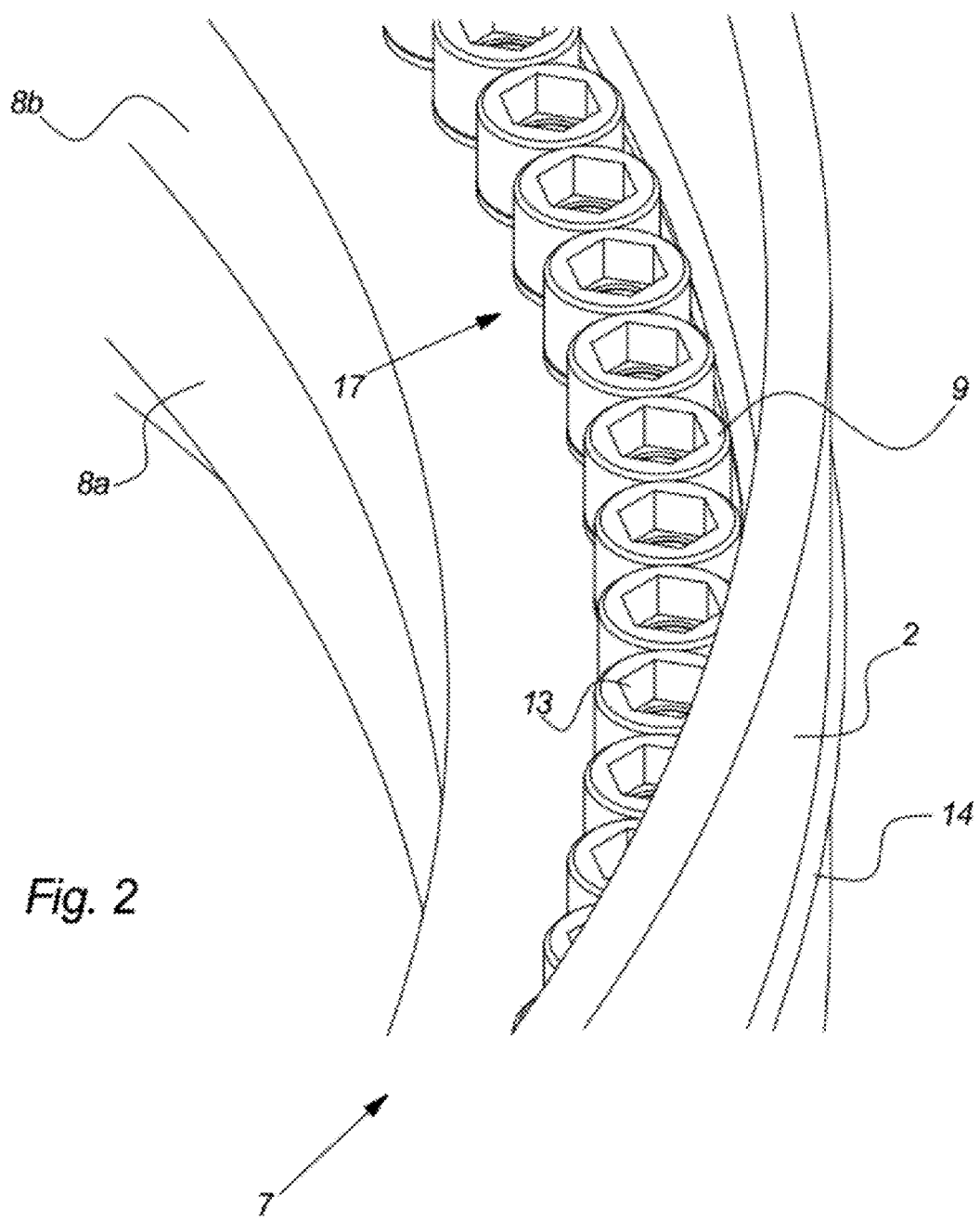
FIG. 2 illustrates a part of a flanged joint in between wind turbine tower sections according to the invention.

FIG. 2 illustrates a part of a flanged joint in between two wind turbine tower sections according to the invention.

The tower flange usually establishes a full circle with the tower section but may also be divided into a number of flange sections which together form a full circle corresponding to the tower section.

The figure especially illustrates a part of an upper tower section 2 which at its lower edge is connected to a first flange 8a in a welding seam 14. The flange 8a has a first and second arm wherein the arms together form a substantially perpendicular angle. The first arm is vertically connected to the upper tower section and the second arm extends horizontally into the interior of the tower.

A lower tower section is connected to a second flange 8b in a welding seam (not illustrated on the figure). The second flange 8b also has a first and second arm wherein the arms together form a substantially perpendicular angle. The first arm is vertically connected to the lower tower section and the second arm extends horizontally into the interior of the tower. The second flange is—more or less—a mirror image of the first flange about a horizontal line.

The first and second flange 8a, 8b meet by the arms extending horizontally into the interior of the tower. Each flange comprises a number of through going holes in one or more arrays e.g. one array of holes spaced apart by the same distance in the full length of the flange. The flanges are fixed to each other by an array 17 of sets of connection means penetrating the flanges through the flange holes and hereby establishing the flanged joint between the two wind turbine tower sections.

The figure especially illustrates a number of nuts 9 which are part of sets of connection means. Each nut is provided with an assembly opening 13 in the top surface of the nut. The opening allows an assembly tool to be entered from above and tighten or loosen the nut as a part of a set of connection means.

Figure 3:
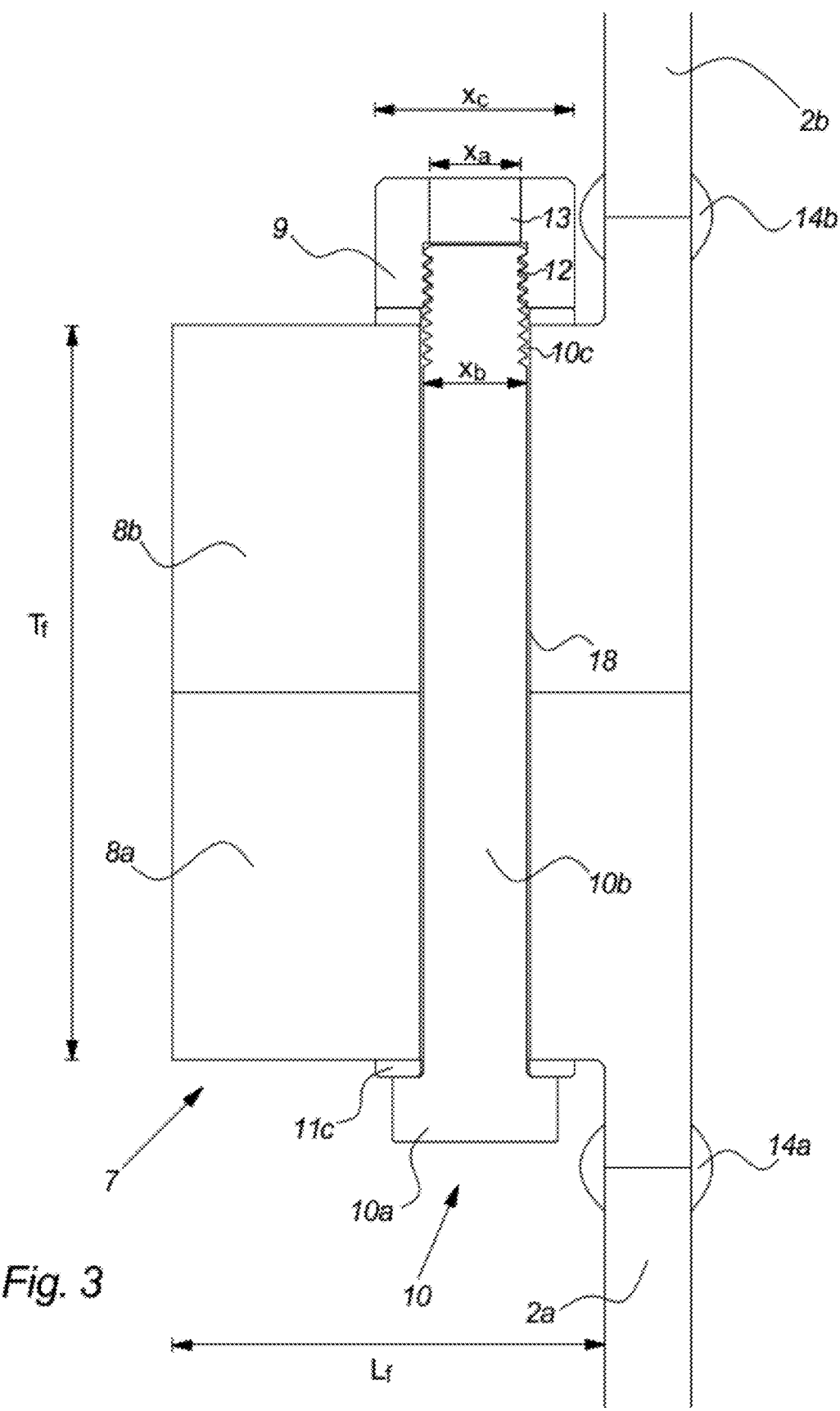
FIG. 3 illustrates a cross view of the flanged joint shown in FIG. 2.
Figure 5:
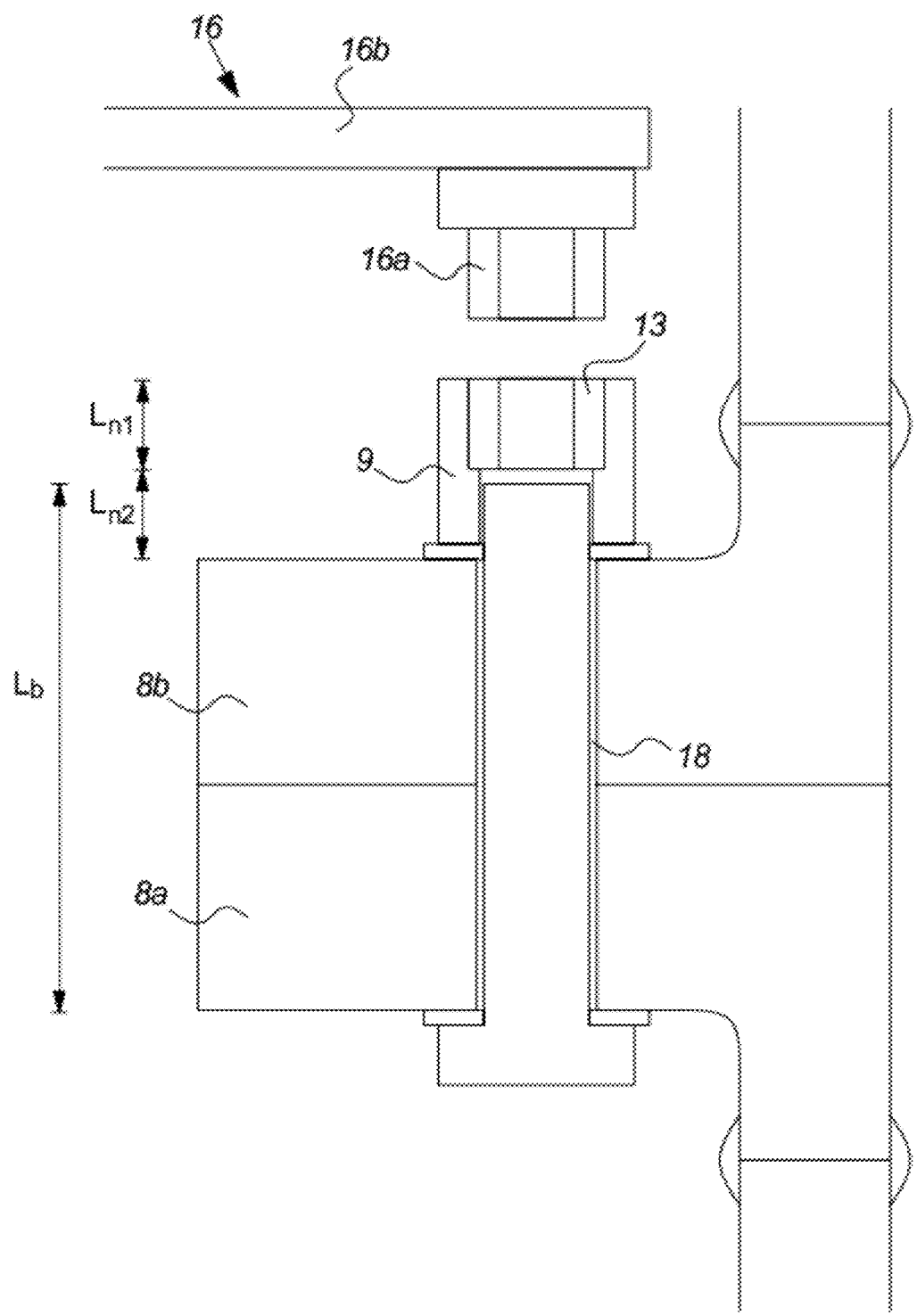
FIG. 5 illustrates a method step in assembling a wind turbine tower according to the invention.

FIGS. 3 and 5 illustrate a cross view of a preferred embodiment of a set of connection means in the flanged joint.

The two flanges 8a, 8b are illustrated with the welding seams 14a, 14b to the lower and the upper tower section, respectively. However, the connection may also be between the foundation with foundation bolts and a first tower section with an initial flange and nuts according to the invention.

Further, the two flanges 8a, 8b are illustrated with their arms making full contact and with a through going hole 18. The hole is occupied by the rod of a bolt 10 connected to a nut 9 at one surface of the flanges and with the bolt head 10a at the opposite surface, said bolt and nut establishing a set of connection means 15 of the jointed flange 7.

The assembly opening 13 of the nut is illustrated with a size Xa e.g. the length from one internal surface to the opposite in a hex shaped socket. The threaded part of the nut is illustrated with a size Xb corresponding to the thread diameter. The nut is finally illustrated with an outer size Xc wherein the outer shape of the nut may be round, hex or any other suitable shape.

Further, FIG. 5 illustrates a method step in assembling or disassembling a wind turbine tower according to the present invention.

The assembly tool 16 is illustrated as wrench with a hex head 16a and a handle 16b. The hex head corresponds to the assembly opening 13 of the nut 9 i.e. the nut of the present embodiment comprises a hex shaped socket.

The socket part of the nut 9 has a depth Ln1 that extends from a top surface of the nut and in to the beginning of the threaded part of the nut. The inner surface of the socket part may interact with the head of the assembly tool and thus allow the nut to be tightened from above instead of from the side.

The threaded part 12 of the nut 9 has a depth Ln2 that extends from a top surface of the nut and in to the beginning of the socket part of the nut. The depth Ln2 at least corresponds to length of the bolt rod 10b extending out of the flange hole 18.

The depths of Ln1 and Ln2 may be chosen freely but are preferably similar in size.

The bolt rod 10*b* including a threaded part 10*c* has a length L b that allows the bolt to extend the necessary distance out of the flange hole 18 in order to establish a threaded connection with the nut 9.

FIG. 3 illustrates the nut with a size Xa being smaller than the size Xb and FIG. 5 illustrates the opposite relationship between the two.

Figure 4:
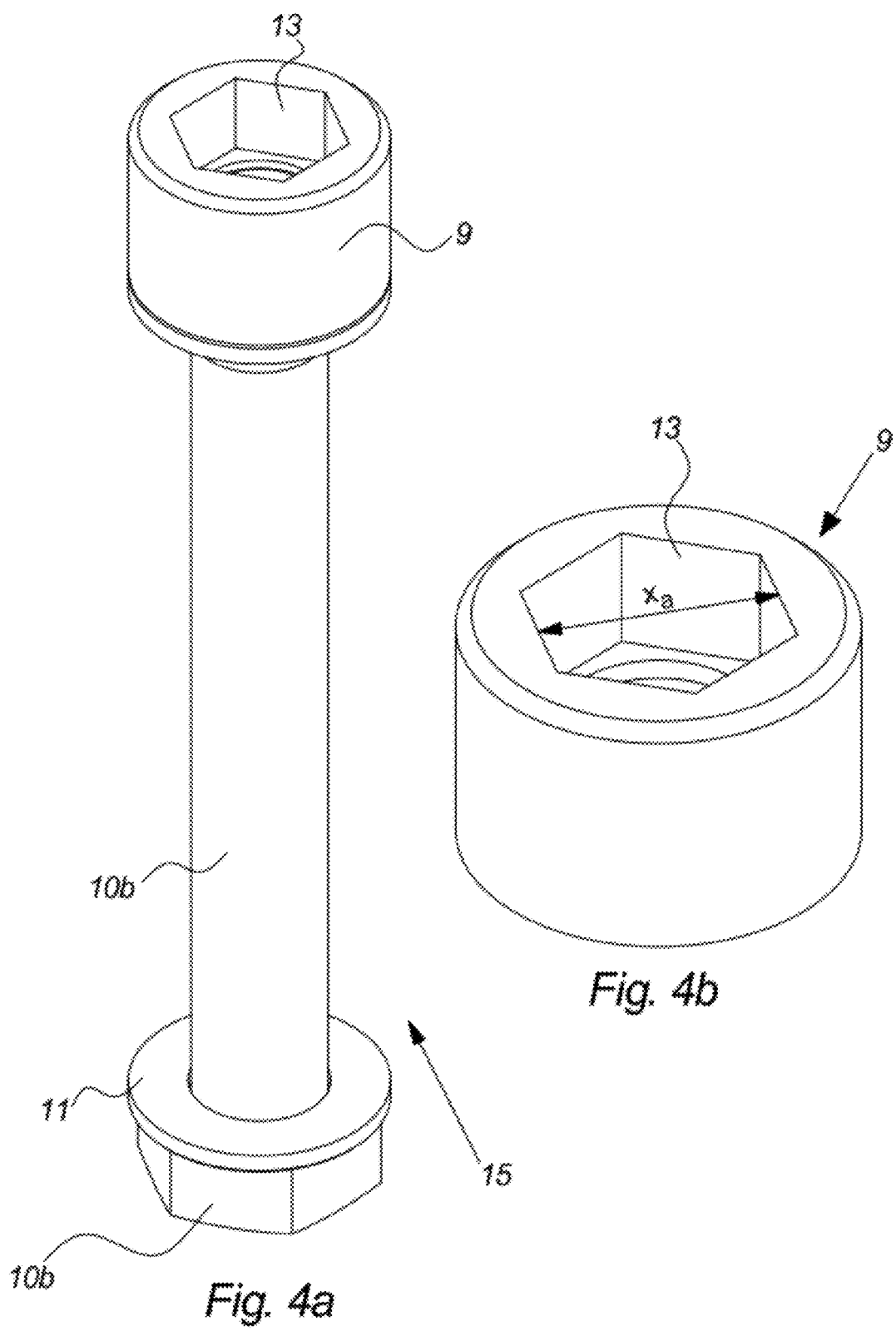
FIGS. 4a and 4b illustrates a preferred embodiment of a connection set comprising a bolt and nut.

FIGS. 4*a* and 4*b* illustrate in perspective views a preferred embodiment of a connection set 15 comprising a bolt 10 and a nut 9.

The internal threaded part 12 of the nut 9 is illustrated as in direct connection with the part comprising assembly opening 13. However, the two parts may also be divided from each other by a wall e.g. to control the entrance of the head of the assembly tool.

The sets of connection means are preferably positioned inside a wind turbine tower but may also be used in flanged joints on the outside of the tower or other types of joints involving a set of connection means such as a bolt and a nut. Further, a set of connection means may involve two nuts and a threaded shaft instead of a bolt and a nut.

In assembling the wind turbine tower it is preferred that the nut is tightened from above i.e. the nut is positioned above the joint e.g. as illustrated in FIG. 2. However, the nut may also be positioned below the joint and thus be tightened from below.

LIST

1. Wind turbine
2. Wind turbine tower including at least two tower sections
2*a*, 2*b*. Tower sections such as tower rings
3. Wind turbine nacelle
4. Wind turbine hub
5. Wind turbine blade
6. Foundation for the wind turbine tower
7. Flanged joint of tower sections
8*a*, 8*b*. Upper and lower flange of a tower section, respectively
9. Nut for connecting tower sections or a tower section to the foundation
10. Bolt
10*a*. Bolt head
10*b*. Bolt rod
10*c*. Threaded part of the bolt shaft
11, 11*a*, 11*b*. Lock washer
12. Internal threaded part of the nut
13. Assembly opening of the nut
14, 14*a*, 14*b*. Welded connection between a tower section and a flange
15. Set of connection means
16. Assembly tools such as a wrench
16*a*. Hex head of the wrench
16*b*. Handle of the wrench
17. Array of sets of connection means
18. Hole in the upper and lower flange
Lb Length of the bolt rod
Lf Length of the flange into the interior of the tower
Ln1 Length/depth of the part of the nut comprising an assembly opening
Ln2 Length/depth of the threaded part of the nut
Tf Total thickness of the two flange arms extending into the interior of the tower
Xa Size of the assembly opening of the nut
Xb Size of the threaded opening of the nut
Xc Outer size of the nut

What is claimed is:

1. A wind turbine tower comprising:
a tower foundation, and
at least two tower sections connected by a plurality of connector sets,
wherein each of said plurality of connector sets comprises a bolt and at least one nut, the nut comprising a threaded part configured to receive the bolt and more than one assembly opening configured to interact with a single assembly tool for rotating the nut about the bolt, the threaded part extending through the nut for a length that is less than the total length of the nut.

2. The wind turbine tower according to claim 1, wherein the threaded part is positioned in a lower part of the nut and comprises an opening with an internal thread corresponding to the thread of the bolt in the set.

3. The wind turbine tower according to claim 2, wherein the size of the opening of the threaded part of the nut is larger than the size of the more than one assembly opening.

4. The wind turbine tower according to claim 1, wherein said more than one assembly opening are positioned in the upper part of the nut and are shaped as a slot, square, penta, hex, cross, or Torx for interacting with the assembly tool.

5. The wind turbine tower according to claim 1, wherein said more than one opening are positioned in the upper part of the nut and are circular shaped sockets for interacting with the assembly tool.

6. The wind turbine tower according to claim 1, wherein said tower sections are connected in a flanged joint with one or more arrays of said connector sets.

7. The wind turbine tower according to claim 6, wherein a length of a shaft of said bolt is prechosen to correspond substantially to the sum of a size of said flanged joint and the length of the internal threaded part of said nut.

8. The wind turbine tower according to claim 1, wherein the nuts of said connector sets are tightened by said assembly tool.

9. The wind turbine tower according to claim 1, wherein said bolts of said connector sets comprise means for interacting with a holding tool.

10. The wind turbine tower according to claim 9, wherein said bolts comprise at least one of a bolt head and an internal opening for interacting with said holding tool.

11. The wind turbine tower according to claim 1, wherein the length of the threaded part is similar to the length of the more than one assembly opening.

12. The wind turbine tower of claim 1, wherein the threaded part extends from a first surface of the nut toward a second surface of the nut, and the more than one assembly opening extends from the second surface of the nut toward the first surface of the nut.

13. The wind turbine tower of claim 1, wherein the more than one assembly opening extends through the nut for a length that is less than the total length of the nut.

14. The wind turbine tower of claim 13, wherein the sum of the length of the threaded part and the length of the more than one assembly opening is less than or equal to the total length of the nut.

15. The wind turbine tower of claim 1, wherein the threaded part and the more than one assembly opening are axially aligned.

16. The wind turbine tower of claim 15, wherein the threaded part and the more than one assembly opening are open to each other.

17. The wind turbine tower of claim 15, wherein the threaded part is separated from the more than one assembly opening by a wall.

18. A connector set for assembling a wind turbine tower, said connector set comprising:

a bolt with a threaded part, and a nut with an internal threaded part corresponding to the thread of said bolt, said nut further comprising more than one assembly opening for interacting with a single assembly tool to rotate the nut about the bolt.

19. The connector set according to claim 18, wherein said more than one assembly opening are positioned in an upper part of the nut in relation to a lower part comprising the internal threaded part such that the total length of the nut is greater than or equal to the sum of the lengths of the more than one assembly opening and internal threaded part.

20. The connector set according to claim 18, wherein said bolt comprises at least one of a bolt head and an internal opening for interacting with a holding tool.

21. The connector set according to claim 18, wherein said more than one assembly opening are positioned in the upper part of the nut and are shaped as a slot, square, penta, hex, cross, or Torx for interacting with the assembly tool to rotate the nut about the bolt.

22. A method for assembling a wind turbine tower comprising at least two tower sections at a wind turbine site, the method comprising the steps of:

establishing a foundation, positioning a first tower section on the foundation and fixating the first tower section to the foundation by a plurality of connector sets, positioning a further tower section on the first tower section and fixating the tower sections by a plurality of connector sets, and so on until the tower is established, wherein each of the plurality of connector sets comprises a bolt and at least one nut, and wherein the fixating is initiated by a single assembly tool tightening the connector set by engaging the assembly tool with more than one assembly opening in the nut of the connector set to rotate the nut about the bolt.

23. The method for assembling according to claim 22, wherein the nut of the connector set is tightened by the assembly tool.

24. The method for assembling according to claim 22, wherein the bolt of the connector set is at least held in place by a holding tool.

\* \* \* \* \*